United States Patent
Zhu et al.

(10) Patent No.: US 10,591,292 B2
(45) Date of Patent: Mar. 17, 2020

(54) METHOD AND DEVICE FOR MOVABLE OBJECT DISTANCE DETECTION, AND AERIAL VEHICLE

(71) Applicant: SZ DJI TECHNOLOGY CO., LTD., Shenzhen (CN)

(72) Inventors: Zhenyu Zhu, Shenzhen (CN); Zihan Chen, Shenzhen (CN); Zhiyuan Zhang, Shenzhen (CN); Weifeng Liu, Shenzhen (CN); Chaobin Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 115 days.

(21) Appl. No.: 15/870,174

(22) Filed: Jan. 12, 2018

(65) Prior Publication Data

US 2018/0156610 A1 Jun. 7, 2018

Related U.S. Application Data

(63) Continuation of application No. PCT/CN2015/083868, filed on Jul. 13, 2015.

(51) Int. Cl.
*G01C 3/08* (2006.01)
*G08G 5/00* (2006.01)
(Continued)

(52) U.S. Cl.
CPC .............. *G01C 3/08* (2013.01); *G01C 3/14* (2013.01); *G05D 1/0094* (2013.01); *G05D 1/10* (2013.01); *G06K 9/0063* (2013.01); *G06K 9/209* (2013.01); *G06K 9/4671* (2013.01); *G06K 9/6202* (2013.01); *G06K 9/78* (2013.01); *G06T 7/248* (2017.01); *G06T 7/292* (2017.01); *G06T 7/593* (2017.01); *G06T 7/60* (2013.01); *G08G 5/0021* (2013.01); *G08G 5/0069* (2013.01);
(Continued)

(58) Field of Classification Search
USPC ............................................................. 701/3
See application file for complete search history.

(56) References Cited

U.S. PATENT DOCUMENTS

| 9,497,380 | B1* | 11/2016 | Jannard | ............. H04N 5/23238 |
| 2013/0173088 | A1* | 7/2013 | Callou | .................. B64C 39/024 701/2 |

(Continued)

FOREIGN PATENT DOCUMENTS

| CN | 101968354 A | 2/2011 |
| CN | 104111058 A | 10/2014 |

(Continued)

OTHER PUBLICATIONS

The World Intellectual Property Organization (WIPO) International Search Report for PCT/CN2015/083868 dated Mar. 24, 2016 7 Pages.

Primary Examiner — Tyler D Paige
(74) Attorney, Agent, or Firm — Anova Law Group, PLLC

(57) ABSTRACT

A method for distance detection includes detecting a first distance value between a movable object and a target object in a target direction of the movable object, obtaining an inclination angle of the movable object at the target direction, and calculating a second distance value from the movable object to the target object based upon the inclination angle and the first distance value.

15 Claims, 12 Drawing Sheets

(51) Int. Cl.

| | | |
|---|---|---|
| *G06K 9/46* | (2006.01) | |
| *G05D 1/00* | (2006.01) | |
| *G08G 5/04* | (2006.01) | |
| *G06T 7/593* | (2017.01) | |
| *G01C 3/14* | (2006.01) | |
| *G05D 1/10* | (2006.01) | |
| *G06T 7/292* | (2017.01) | |
| *G06T 7/246* | (2017.01) | |
| *G06K 9/00* | (2006.01) | |
| *G06K 9/20* | (2006.01) | |
| *G06K 9/62* | (2006.01) | |
| *G06K 9/78* | (2006.01) | |
| *G06T 7/60* | (2017.01) | |
| *G01C 9/00* | (2006.01) | |

(52) U.S. Cl.
CPC .............. *G08G 5/04* (2013.01); *G08G 5/045* (2013.01); *B64C 2201/14* (2013.01); *G01C 9/005* (2013.01); *G06K 2209/21* (2013.01); *G06T 2207/10012* (2013.01); *G06T 2207/10032* (2013.01); *G06T 2207/30261* (2013.01)

(56) References Cited

U.S. PATENT DOCUMENTS

| | | | | |
|---|---|---|---|---|
| 2015/0339931 | A1* | 11/2015 | Yu | G05D 1/0214 |
| | | | | 701/122 |
| 2016/0364989 | A1* | 12/2016 | Speasl | G08G 5/0034 |
| 2017/0183074 | A1* | 6/2017 | Hutson | B64C 1/061 |
| 2017/0355453 | A1* | 12/2017 | Kim | B64C 25/24 |
| 2018/0156610 | A1* | 6/2018 | Zhu | G01S 11/00 |
| 2018/0259652 | A1* | 9/2018 | Shimizu | G01S 17/89 |
| 2019/0179303 | A1* | 6/2019 | Margolin | B64C 39/024 |

FOREIGN PATENT DOCUMENTS

| | | |
|---|---|---|
| CN | 104656665 A | 5/2015 |
| CN | 104730533 A | 6/2015 |
| EP | 2511781 A1 | 10/2012 |

* cited by examiner

METHOD AND DEVICE FOR MOVABLE OBJECT DISTANCE DETECTION, AND AERIAL VEHICLE

CROSS-REFERENCE TO RELATED APPLICATION

This application is a continuation application of International Application No. PCT/CN2015/083868 filed on Jul. 13, 2015, the entire contents of which are incorporated herein by reference.

TECHNICAL FIELD

The present disclosure relates to the technical field of electronics, and more particularly to a method and device for movable object distance detection, and an aerial vehicle.

BACKGROUND OF THE DISCLOSURE

With the developments in technology, remote control intelligent movable apparatuses, such as remote control robots, remote control cars, unmanned aerial vehicles, can perform reconnaissance and surveillance tasks for a wide variety of military and civilian applications.

A distance from the movable apparatus to an object can be detected during a flight of the movable apparatus to detect or track the object in real time. However, the prior detecting distance is not accurate, leading to an inaccurate determination of the movable apparatus and inaccurate detecting or tracking.

SUMMARY OF THE DISCLOSURE

Embodiments of the present disclosure provide a method and device for movable object distance detection, and an aerial vehicle which enable a more accurate distance detection.

An aspect of the disclosure provides a method for movable object distance detection, the method comprising detecting a first distance value between the movable object and a target object, the target object being positioned in a target direction of the movable object; obtaining an inclination angle of the movable object at the target direction, and calculating a second distance value from the movable object to the target object based upon the inclination angle and the first distance value; and determining the second distance value as an actual distance between the movable object and the target object.

In some embodiments, the method can further comprise controlling a movement of the movable object based upon the second distance value.

In some embodiments, detecting a first distance value between the movable object and the target object can comprise obtaining the first distance value between the movable object and the target object based upon distance sensing data of a distance sensing.

In some embodiments, detecting a first distance value between the movable object and the target object can comprise obtaining the first distance value between the movable object and the target object based upon visual sensing data of a visual sensing.

In some embodiments, obtaining the first distance value between the movable object and the target object based upon visual sensing data of a visual sensing can comprise obtaining at least two images in the target direction; determining feature points in each of the at least two images, comparing feature points and determining correlated feature points between the at least two images; and calculating the first distance value between the movable object and the target object based upon the correlated feature points.

In some embodiments, determining feature points in each of the at least two images can comprise obtaining an inclination angle of the movable object at the target direction; and determining an effective area in each of the at least two images based upon the inclination angle, and determining a feature point in an effective area of each of the at least two images.

In some embodiments, the correlated feature points can be a group of sparse feature points, and the calculating the first distance value between the movable object and the target object based upon the correlated feature points can comprise calculating the first distance value between the movable object and the target object based upon the sparse feature points.

In some embodiments, the correlated feature points can be a group of dense feature points, and the calculating the first distance value between the movable object and the target object based upon the correlated feature points can comprise calculating the first distance value between the movable object and the target object based upon the dense feature points.

In some embodiments, the first distance value can be an average value of a plurality of distance values between the movable object and the target object.

In some embodiments, the detecting a first distance value between the movable object and a target object can comprise: obtaining distance sensing data sensed by a distance sensing process, and calculating a distance value from the distance sensing data; if the calculated distance value is less than a preset distance threshold, determining the calculated distance value as the first distance value; if the calculated distance value is larger than the preset distance threshold, determining a distance value between the movable object and the target object sensed by a visual sensing process as the first distance value.

In some embodiments, controlling a movement of the movable object based upon the actual distance can comprise performing an obstacle avoidance based upon the actual distance. The obstacle avoidance can comprise limiting a moving speed or avoiding the target object.

In some embodiments, the controlling a movement of the movable object based upon the actual distance can comprise performing a target tracking based upon the actual distance. The target tracking can comprise controlling a movement of the movable object such that a distance between the movable object and the target object can be within a predetermined tracking distance threshold.

Another aspect of the disclosure further provides a device for movable object distance detection, the device comprising: a detection module configured to detect a first distance value between the movable object and a target object, the target object being positioned in a target direction of the movable object; and a processing module configured to obtain an inclination angle of the movable object at the target direction, calculate a second distance value from the movable object to the target object based upon the inclination angle and the first distance value, and determine the second distance value as an actual distance between the movable object and the target object.

In some embodiments, the device can further comprise a control module configured to control a movement of the movable object based upon the actual distance.

In some embodiments, the detection module can be configured to obtain the first distance value between the movable object and the target object based upon distance sensing data of a distance sensing.

In some embodiments, the detection module can be configured to obtain the first distance value between the movable object and the target object based upon visual sensing data of a visual sensing.

In some embodiments, the detection module can comprise: a capturing unit configured to obtain at least two images in the target direction; a comparing unit configured to determine feature points in each of the at least two images and compare feature points and determine correlated feature points between the at least two images; and a determining unit configured to calculate the first distance value between the movable object and the target object based upon the correlated feature points.

In some embodiments, the comparing unit can be configured to obtain an inclination angle of the movable object at the target direction, determine an effective area in each of the at least two images based upon the inclination angle, and determine a feature point in an effective area of each of the at least two images.

In some embodiments, the determined feature points can be a group of sparse feature points. The determining unit can be configured to calculate the first distance value between the movable object and the target object based upon the sparse feature points.

In some embodiments, the determined feature points are a group of dense feature points. The determining unit can be configured to calculate the first distance value between the movable object and the target object based upon the dense feature points.

In some embodiments, the first distance value can be an average value of a plurality of distance values between the movable object and the target object.

In some embodiments, the detection module can comprise: a first obtaining unit configured to obtain distance sensing data sensed by a distance sensing process and calculate a distance value from the distance sensing data; a distance value determining unit configured to, if the calculated distance value is less than a preset distance threshold, set the calculated distance value as a first distance value; and a second obtaining unit configured to, if the calculated distance value is larger than the preset distance threshold, set a distance value between the movable object and the target object sensed by a visual sensing process as the first distance value.

In some embodiments, the control module can be configured to perform an obstacle avoidance based upon the actual distance. The obstacle avoidance can comprise limiting a moving speed or avoiding the target object.

In some embodiments, the control module can be configured to perform a target tracking based upon the actual distance. The target tracking operation can comprise controlling a movement of the movable object such that a distance between the movable object and the target object can be within a predetermined tracking distance threshold.

A yet aspect of the disclosure further provides an aerial vehicle, the aerial vehicle comprising a propulsion device, a flight controller and a sensor. The sensor can be configured to sense distance data from the aerial vehicle to a target object. The flight controller can be configured to determine a first distance value from the aerial vehicle to a target object based upon the distance data of the sensor, the target object being positioned in a target direction of the aerial vehicle, obtain an inclination angle of the aerial vehicle at the target direction, and calculate a second distance value from the aerial vehicle to the target object based upon the inclination angle and the first distance value. The flight controller can be further configured to provide a control instruction to the propulsion device to control the propulsion device to effect a movement the aerial vehicle based upon the second distance value.

A still yet aspect of the disclosure further provides an aerial vehicle, the aerial vehicle comprising a propulsion device, a flight controller and a sensor. The sensor can be configured to detect a first distance value from the aerial vehicle to a target object, the target object being positioned in a target direction of the movable object. The flight controller can be configured to obtain an inclination angle of the aerial vehicle at the target direction, and calculate a second distance value from the aerial vehicle to the target object based upon the inclination angle and the first distance value. The flight controller can be further configured to provide a control instruction to the propulsion device to control the propulsion device to effect a movement of the aerial vehicle based upon the second distance value.

Embodiments of the disclosure can correct a directly measured distance value to obtain a more accurate distance value, thereby enabling an accurate movement control of the movable object.

DETAILED DESCRIPTION OF THE DISCLOSURE

A better understanding of the disclosure will be obtained by reference to the following detailed description that sets forth illustrative embodiments with reference to the drawings. It will be apparent that, the embodiments described herein are merely some embodiments of the disclosure. Those skilled in the art can conceive various embodiments in light of those embodiments disclosed herein without inventive efforts, and all these embodiments are within the scope of the disclosure.

With embodiments of the disclosure, in detecting a distance between a movable object and a target object, a directly detected distance can be corrected with an inclination angle of the movable object. Therefore, a more accurate distance value can be obtained, enabling an accurate movement control including an obstacle avoidance and a tracking based on the distance value.

Figure 1:
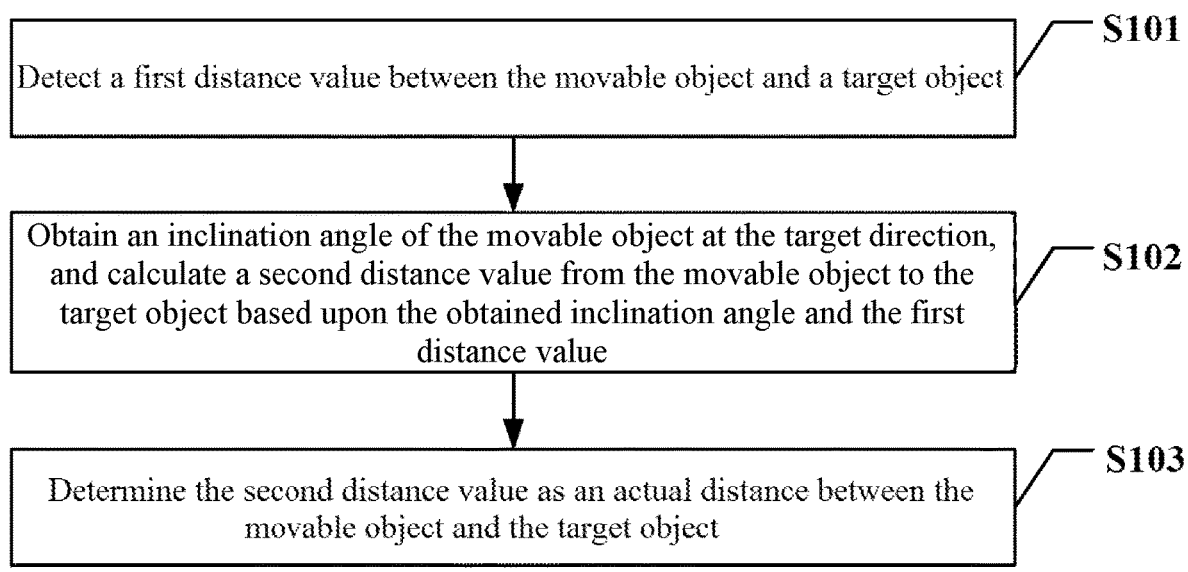
FIG. 1 shows a flowchart of a method for movable object distance detection in accordance with an embodiment of the disclosure.

FIG. 1 shows a flowchart of a method for movable object distance detection in accordance with an embodiment of the disclosure. The method can be performed by a processor. In some instances, the method can be performed by a movement controller onboard a movable object, such as a flight controller onboard an unmanned aerial vehicle. In some embodiments, the method can comprise steps S101 to S103.

In step S101, a process of detecting a first distance value between the movable object and a target object can be performed. The target object can be positioned in a target direction of the movable object.

Figure 2:
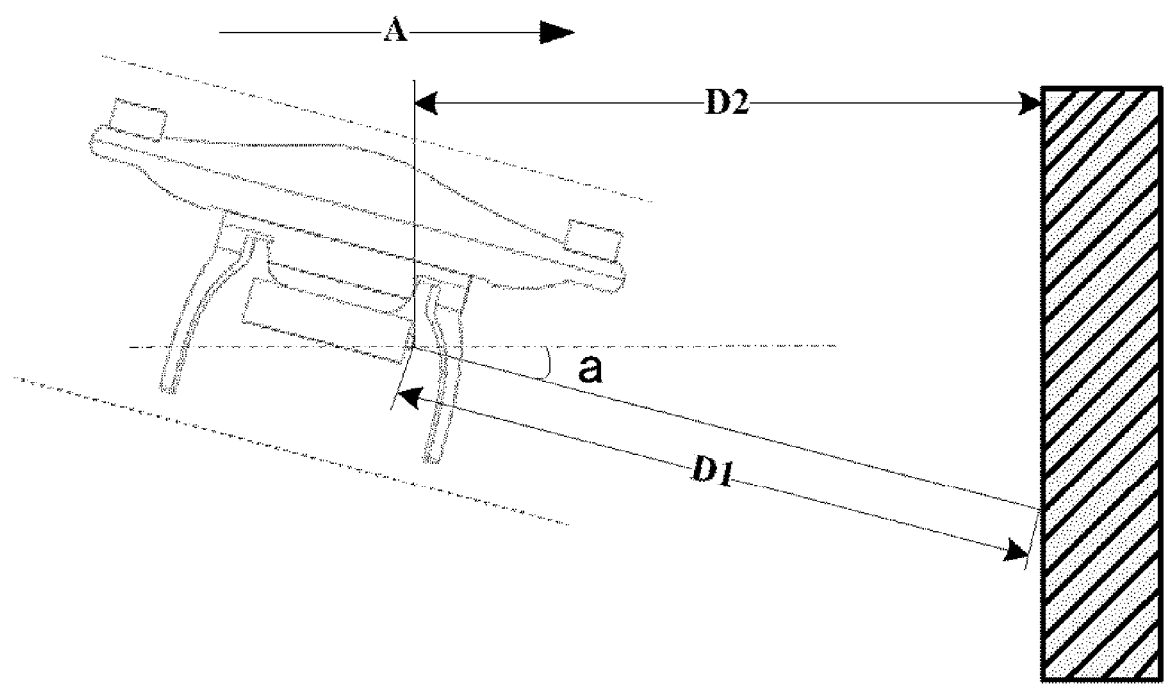
FIG. 2 shows a schematic view of determining a distance between a movable object and a target object in accordance with an embodiment of the disclosure.

The target direction can be a dead ahead in a movement of the movable object. For instance, the target direction can be a direction A (e.g., a flight direction) as shown in FIG. 2. The movable object can be provided with a monocular or binocular visual sensor, a distance sensor such as an ultrasonic sensor, an infrared sensor, a radar sensor and/or a laser sensor, and other sensor capable of sensing a distance. The first distance value D1 can be calculated from a sensed data provided by the visual sensor and/or distance sensor as discussed hereinabove.

The visual sensor or distance sensor can be configured to sense and calculate a distance values to an area, and distances from the movable object to a plurality of feature points on a given plane of the target object can be obtained. Therefore, the first distance value D1 can be a special value. In some instances, the first distance value D1 can be an average of distance values from the movable object to a plurality of points. Optionally, the first distance value D1 can be a distance value from the movable object to a feature point among a plurality having a most prominent feature, thus the distance value can be the most accurate distance value.

In some instances, the first distance value D1 between the movable object and the target object can be detected and obtained based upon distance sensing data of a distance sensing. Optionally, the first distance value D1 between the movable object and the target object can be detected and obtained based upon an visual sensing data of a visual sensing.

In step S102, a process of obtaining an inclination angle of the movable object at the target direction and calculating a second distance value from the movable object to the target object based upon the obtained inclination angle and the first distance value can be performed.

The inclination angle a can be measured using a sensor onboard the movable object, such as a gyroscope or an accelerometer. The inclination angle a can be an intersection angle between a moving direction of the movable object and a horizontal plane. In other words, the inclination angle a can be an intersection angle between the target direction and the horizontal plane. For example, an aerial vehicle can be inclined as shown in FIG. 2 when the aerial vehicle is travelling forward. The inclination and rotation can be sensed by a sensor onboard the aerial vehicle to obtain the inclination angle a.

Once the first distance value D1 and the inclination angle a are obtained, a computation can be performed to the first distance value D1 and the inclination angle using trigonometric functions, such that the second distance value D2 can be obtained by correcting the first distance value D1.

In step S103, a process of determining the second distance value as an actual distance between the movable object and the target object can be performed.

Once the actual distance between the movable object and the target object is determined, the actual distance value can be directly provided to a connected controller, such that the controller can direct a movement of the movable object based upon the actual distance value. Optionally, the actual distance can be provided to a user, such that the user can view the actual distance.

In some instances, a movement of the movable object can be controlled based upon the actual distance. Once obtaining the actual distance D2 which is corrected and thus more accurate, the movable object can be controlled to effect a manipulation including an obstacle avoidance and a tracking based upon the actual distance D2. For instance, in case actual distance D2 is less than a distance threshold, a movement of the movable object can be stopped to avoid a crashing onto the target object. Optionally, a new flight route can be planned to bypass the target object. For instance, in case the actual distance D2 is larger than a distance threshold, a further movement of the movable object can be necessary to keep the target object within the distance threshold to enable a surveillance.

It will be appreciated that, the visual sensor or distance sensor can measure a distance from the sensor to the target object. Therefore, a predetermined value (e.g., a value D) can be added to the distance value which is calculated from a sensed data. Optionally, the distance value calculated from the sensed data can be used directly as the first distance value D1 between the movable object and the target object, and a distance threshold can be configured in view of a fixed value to effect a movement control.

With embodiments of the disclosure, a directly detected distance value can be corrected to obtain a more accurate distance value, thereby enabling a more accurate control on a movement of the movable object.

Figure 3:
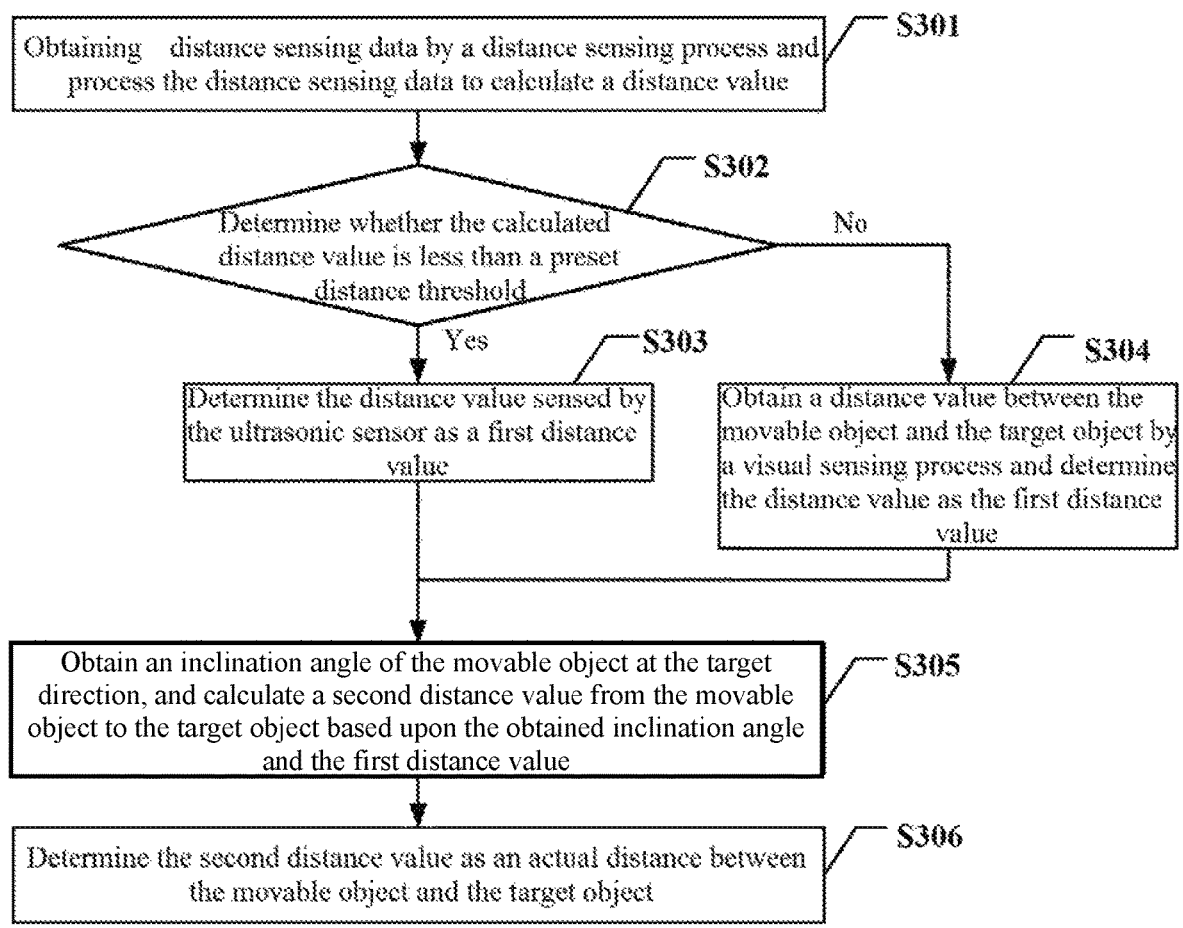
FIG. 3 shows a flowchart of a method for movable object distance detection in accordance with another embodiment of the disclosure.

FIG. 3 shows a flowchart of a method for movable object distance detection in accordance with another embodiment of the disclosure. The method can be performed by a processor. In some instances, the method can be performed by a movement controller onboard a movable object, such as a flight controller onboard an unmanned aerial vehicle. In some embodiments, the method can comprise steps S301 to S306.

In step S301, a process of obtaining distance sensing data by a distance sensing process and processing the distance sensing data to calculate a distance value can be performed.

In some instances, the distance sensing process can comprise effecting a distance sensing using a sensed data of a distance sensor. The distance sensor can comprise an ultrasonic sensor, an infrared sensor, a radar sensor and/or a laser sensor.

In step S302, a process of determining whether the calculated distance value is less than a preset distance threshold can be performed.

In some instances, the distance threshold can be set based upon an effective detection range of a distance sensor such as an ultrasonic sensor. The effective detection range of a general ultrasound can be about 3 meters. The preset distance threshold can be set as 3 meters if an ultrasound is used as the distance sensor for sensing a distance. A distance value sensed by the ultrasonic sensor can be set as a first distance value if the distance value sensed by the ultrasonic sensor is less than 3 meters. That is, a step S303 can be performed. Otherwise, a step S304 in which a visual sensor is used can be performed if the distance value sensed by the ultrasonic sensor is not less than 3 meters.

In step S303, a process of determining the distance value sensed by the ultrasonic sensor as a first distance value can be performed if the calculated distance value is less than the preset distance threshold.

In step S304, a process of obtaining a distance value between the movable object and the target object by a visual sensing process and determining the distance value as the first distance value can be performed if the calculated distance value is larger than the preset distance threshold.

In step S305, a process of obtaining an inclination angle of the movable object at a target direction and calculating a second distance value from the movable object to the target object based upon the obtained inclination angle and the first distance value can be performed.

The inclination angle can be measured using a sensor onboard the movable object, such as a gyroscope or an accelerometer. The inclination angle can be an intersection angle between a moving direction of the movable object and a horizontal plane. In other words, the inclination angle can be an intersection angle between the target direction and the horizontal plane. For example, an aerial vehicle can be inclined as shown in FIG. 2 when the aerial vehicle is travelling forward. The inclination and rotation can be sensed by a sensor onboard the aerial vehicle to obtain the inclination angle.

Once the first distance value and the inclination angle are obtained, a computation can be performed to the first distance value and the inclination angle using trigonometric functions, such that the second distance value can be obtained by correcting the first distance value. For example, a formula D2=cos(a)*D1 can be used, where D2 being the second distance value, D1 being the first distance value, and a being the inclination angle.

In step S306, a process of determining the second distance value as an actual distance between the movable object and the target object can be performed.

In some instances, a movement of the movable object can be controlled based upon the actual distance. Controlling the movement of the movable object based upon the actual distance can comprise performing an obstacle avoidance based upon the actual distance. For instance, the obstacle avoidance can comprise limiting a moving speed or avoiding a target object.

With the obtained actual distance available, a flight speed of the movable object can be slowed down until reaching a predefined minimum speed if the movable object getting closer to the target object. When the movable object moves at a high speed, a current moving speed of the movable object and a distance for stopping the movable object from the current moving speed (also referred to as a "stopping distance") can be known. When the movable object detects a target object in the front and if a distance to the target object is shorter than a distance threshold that is a sum of the stopping distance and a safe distance, the movable object can enter into an emergent braking state to prevent avoid crashing onto the obstacle, e.g., the target object. If the distance to the target object is shorter than the safe distance (and hence is shorter than the distance threshold), the aircraft, e.g., the movable object can automatically retreat to a position outside the safe distance. A speed of the retreating can be faster if the distance to the detected target object is smaller.

Controlling the movement of the movable object based upon the actual distance can further comprise tracking a target based upon the actual distance. In some instances, tracking a target can comprise controlling a movement of the movable object such that a distance between the movable object and the target object is within a predetermined tracking distance threshold.

Figure 4:
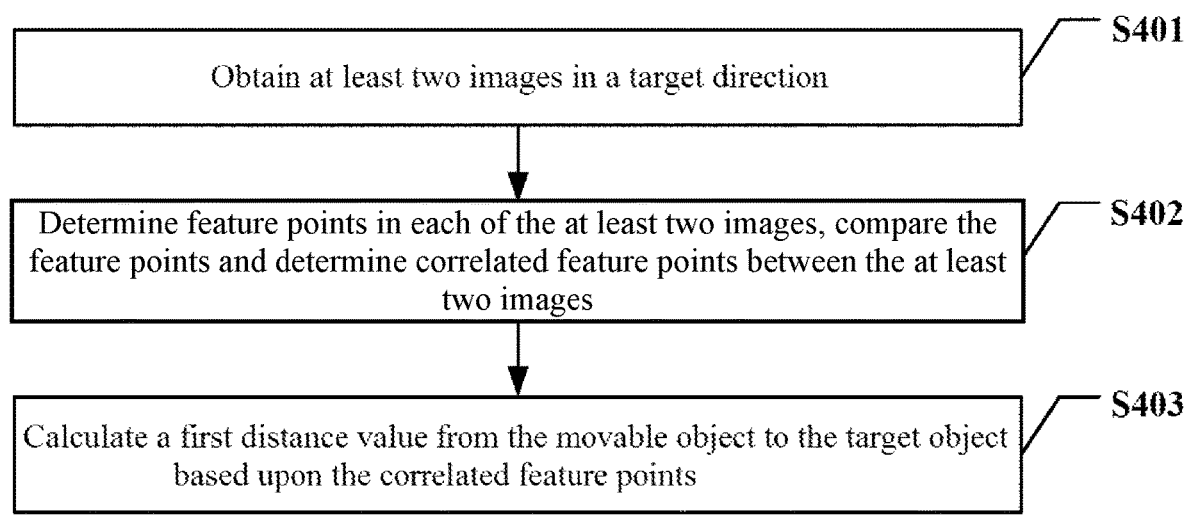
FIG. 4 shows a flowchart of a method of measuring a distance value in accordance with an embodiment of the disclosure.

FIG. 4 shows a flowchart of a method of measuring a distance value in accordance with an embodiment of the disclosure. In some embodiments, the first distance value as discussed hereinabove can be calculated using a binocular visual sensor. The method can comprise steps S401 to S403.

In step S401, a process of obtaining at least two images in a target direction can be performed.

Figure 5:
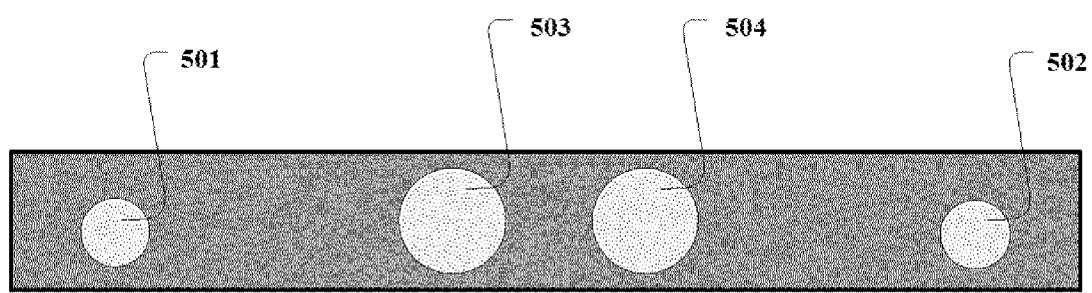
FIG. 5 shows a structure of a sensor assembly sensing a distance in accordance with an embodiment of the disclosure.

FIG. 5 shows a configuration of a sensor assembly capable of sensing a distance which can comprise two visual sensors (e.g., a camera 501 and a camera 502). In addition, FIG. 5 shows distance sensors such as an ultrasonic probe 503 and an ultrasonic probe 504. The sensor assembly can be provided on each surface of the movable object, such that a distance value from the movable object to the target object in every possible moving direction of the movable object can be measured.

A pixel can be identified in an image captured by camera 502 corresponding to a pixel in an image captured by camera 501, and vice versa. The first distance value can be calculated from two corresponding pixels, coordinates of the pixels in respect image, a focal length of each camera and a distance between the two cameras.

In step S402, a process of determining feature points in each of the at least two images, comparing the feature points and determining correlated feature points between the at least two images can be performed.

Pixels having prominent characteristics can be extracted from images captured by the binocular visual. A process of extracting a feature point can be implemented using an algorithm such as FAST (features from accelerated segment test), SIFT (scale-invariant feature transform) or SURF (speeded up robust features). For instance, a feature point extracted by the FAST algorithm can calculate using a brief (binary robust independent elementary features) operator.

Correlated feature points between two images can be determined by a binocular feature point matching. For instance, correlated feature points can be determined by comparing a degree of similarity of corresponding pixels between two images using the brief operators of the feature points, which brief operator being calculated using the FAST algorithm. The correlated feature points can comprise pixels of a measured point of the target object in two binocular visual images.

In step S403, a process of calculating a first distance value from the movable object to the target object based upon the determined correlated feature points can be performed.

Figure 6:
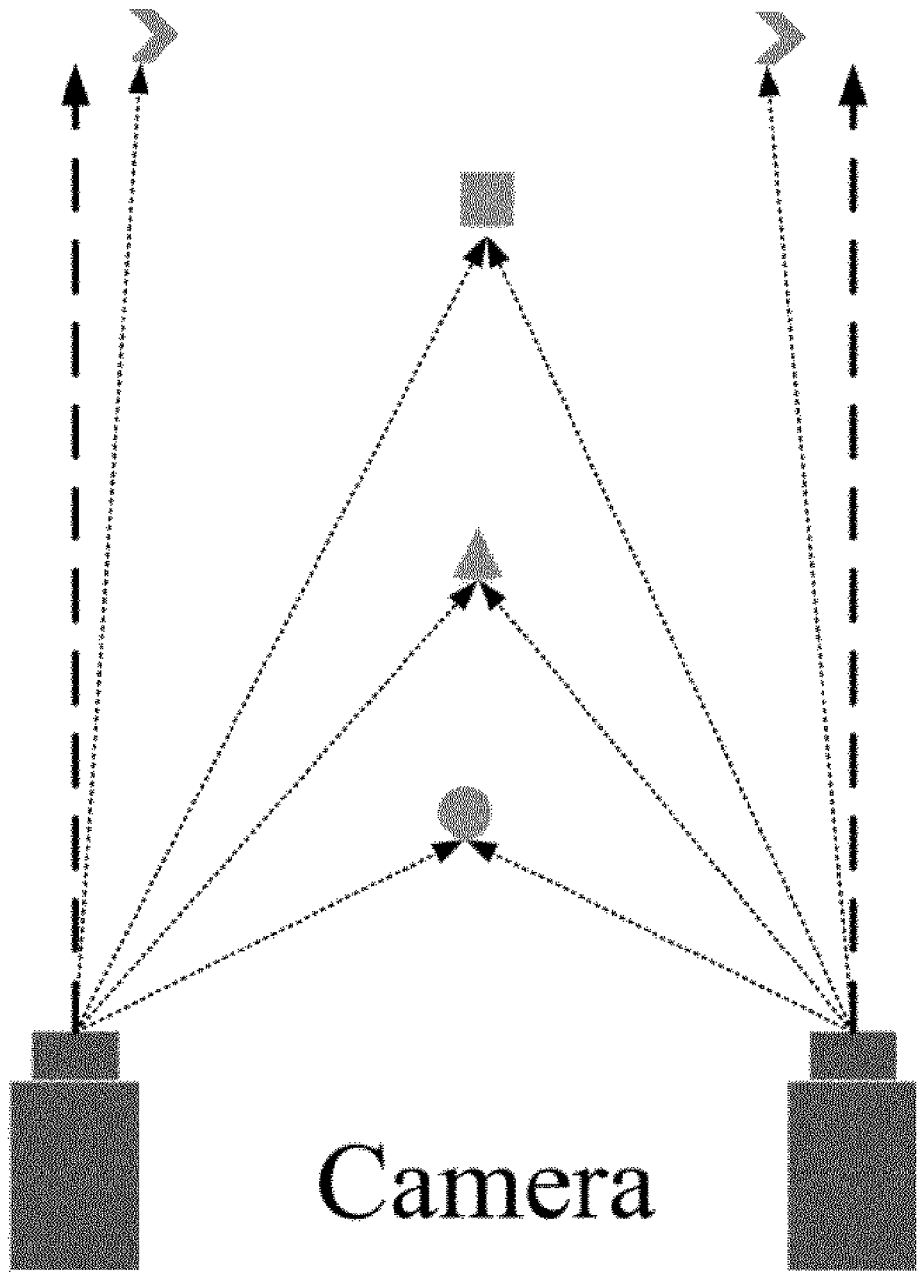
FIG. 6 shows a distance measurement using a binocular camera in accordance with an embodiment of the disclosure.
Figure 7:
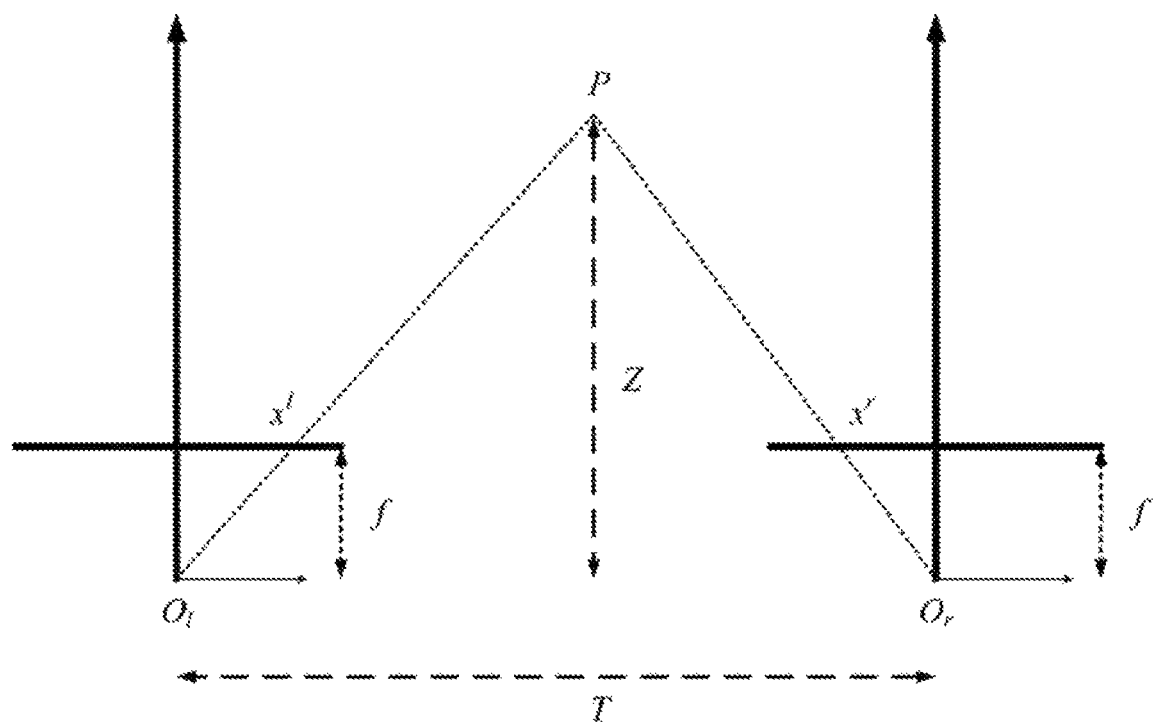
FIG. 7 shows a calculation in distance measurement using a binocular camera in accordance with an embodiment of the disclosure.

Once the correlated feature points are determined, a distance value to each feature point can be calculated based upon triangulation, and the first distance value can then be obtained. FIG. 6 and FIG. 7 show a theory of binocular visual distance measurement. A distance value from the movable object to a measured point P can be calculated as $Z=f^T/(x^l-x^r)$, where Z being the distance value from the movable object to a measured point P, f being a focal length of a camera, T being a distance between two cameras, and $x^l$, $x^r$ being the coordinates of the measured point P projected on two images (e.g., the coordinates of the correlated feature points on respect image). The first distance value can be obtained by averaging the distance values obtained from a plurality of measured points.

In some instances, areas in the two images, in which areas the correlated feature points are positioned, can be specified to reduce a computation in determining the correlated feature points. In some instances, the process of determining feature points in the at least two images can comprise obtaining an inclination angle of the movable object at a target direction, determining an effective area in each of the at least two images based upon the obtained angle and determining a feature point in the effective area of each image.

The inclination angle of the movable object can be obtained using an IMU (inertial measurement unit). A camera can point downward with a movement of the movable object, thus an image captured by the camera can comprise an area including a dead head area of the movable object and an area below the dead head area of the movable object. The dead head area of the movable object can be positioned at an upper portion of the image captured by the camera. Once the inclination angle is measured by the IMU, a proportion of the dead head area of the movable object in the image can be estimated, such that the effective area can be determined for further calculation. If the camera points upward with the movable object, then the dead head area of the movable object can be positioned at a lower portion of the image captured by the camera. The effective area can be similarly determined based upon the inclination angle measured by the IMU.

In some instances, a group of relatively sparse feature points can be obtained using the FAST algorithm. The first distance value from the movable object to the target object can be calculated based upon the determined sparse feature points.

Optionally, a group of dense feature points can be obtained by a block matching in combination of speckled filter. The first distance value from the movable object to the target object can be calculated based upon the determined dense feature points.

With embodiments of the disclosure, a directly detected distance value can be corrected to obtain a more accurate distance value, thereby enabling a more accurate control on a movement of the movable object.

A detailed description will be provided to a device for detecting distance for a movable object and an aerial vehicle in accordance with embodiments of the disclosure.

Figure 8:
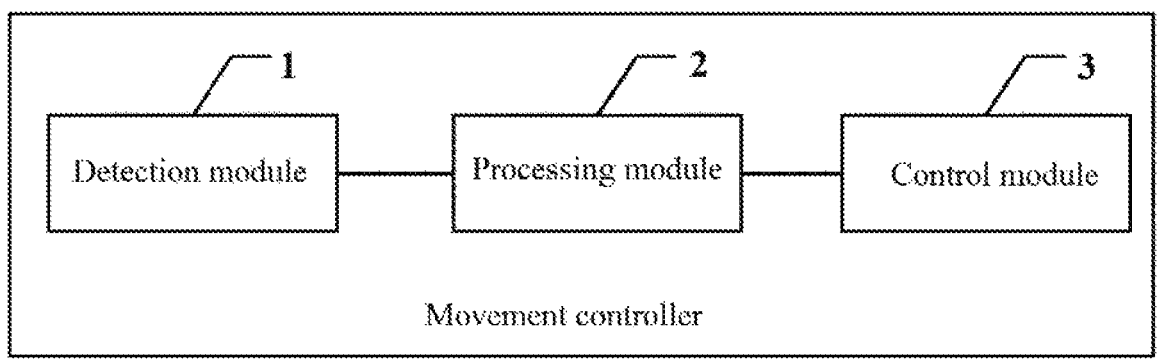
FIG. 8 shows a structure of a device for detecting distance for a movable object in accordance with an embodiment of the disclosure.

FIG. 8 shows a structure of a device for detecting distance for a movable object in accordance with an embodiment of the disclosure. In some instances, the device can be provided in a processor. Optionally, the device can be provided in movement controller onboard a movable object, such as a flight controller of an aerial vehicle. In some embodiments, the device can comprise detection module 1 and a processing module 2.

The detection module 1 can be configured to detect a first distance value between the movable object and a target object. The target object can be positioned in a target direction of the movable object.

The processing module 2 can be configured to obtain an inclination angle of the movable object at the target direction, calculate a second distance value from the movable object to the target object based upon the obtained inclination angle and the first distance value, and determine the second distance value as an actual distance between the movable object and the target object.

In some instances, the device can further comprise a control module 3 configured to control a movement of the movable object based upon the actual distance.

The target direction can be a dead ahead in a movement direction of the movable object. The movable object can be provided with a monocular or binocular visual sensor, a distance sensor such as an ultrasonic sensor, an infrared sensor, a radar sensor and/or a laser sensor, and other sensors capable of sensing a distance. The detection module 1 can be configured to calculate the first distance value from a sensed data sensed by the visual sensor and/or the distance sensor.

The detection module 1 can obtain distances from the movable object to a plurality of feature points on a given plane of the target object. Therefore, the first distance value can be a special value. In some instances, the first distance value can be an average of a plurality of distance values from the movable object to more than one of the plurality of feature points. Optionally, the first distance value can be a distance value from the movable object to a feature point among the plurality of feature points having a most prominent feature, thus the distance value can be the most accurate distance value.

In some instances, the detection module 1 can be configured to detect and obtain the first distance value between the movable object and the target object based upon distance sensing data of a distance sensing. Optionally, the detection module 1 can be configured to detect and obtain the first distance value between the movable object and the target object based upon an visual sensing data of a visual sensing.

The processing module 2 can be configured to obtain an inclination angle from a sensed data of a sensor onboard the movable object, such as a gyroscope or an accelerometer. The inclination angle a can be an intersection angle between a moving direction of the movable object and a horizontal plane. In other words, the inclination angle a can be an intersection angle between the target direction and the horizontal plane. For example, an aerial vehicle can be inclined when the aerial vehicle is travelling forward. The processing module 2 can be configured to sense the inclination and rotation using a sensor onboard the aerial vehicle to obtain the inclination angle.

Once the first distance value and the inclination angle are obtained, a computation to the first distance value and the inclination angle using trigonometric functions can be performed by the processing module 2, such that the second distance value can be obtained by correcting the first distance value. The second distance value can be the actual distance between the movable object and the target object.

Once obtaining the corrected and more accurate actual distance between the movable object and the target object, the processing module 2 can be configured to directly provide the actual distance to other controllers or a user end. Optionally, the processing module 2 can be configured to directly control the movable object, through the control module 3, to effect a manipulation including an obstacle avoidance, tracking and monitoring based upon the actual distance. For instance, in case the actual distance is less than a distance threshold, a movement of the movable object can be stopped to avoid a crashing onto the target object. Optionally, a new flight route can be planned to bypass the target object. For instance, in case the actual distance is larger than a distance threshold, a further movement of the movable object can be necessary to keep the target object within the distance threshold to enable a surveillance.

It will be appreciated that, the visual sensor or distance sensor can measure a distance from the sensor to the target object. Therefore, a predetermined value can be added to the distance value which is calculated from a sensed data. Optionally, the distance value calculated from the sensed data can be used directly as the first distance value between the movable object and the target object, and a distance threshold can be configured in view of a fixed value to effect a movement control.

With embodiments of the disclosure, a directly detected distance value can be corrected to obtain a more accurate distance value, thereby enabling a more accurate control on a movement of the movable object.

Embodiments of the disclosure further provide a structure of another device for detecting distance for a movable object. In some instances, the device can be provided in a processor. Optionally, the device can be disposed in a movement controller onboard a movable object, such as a flight controller of an aerial vehicle. In some embodiments, the device can comprise the detection module 1, processing module 2 and control module 3 as discussed hereinabove.

In some embodiments, the detection module 1 can be configured to detect and obtain a first distance value between the movable object and the target object based upon distance sensing data of a distance sensing. The distance sensor can comprise an ultrasonic distance sensor, a radar distance sensor or an infrared distance sensor.

In some embodiments, the detection module 1 can be configured to detect and obtain a first distance value between the movable object and the target object based upon visual sensing data of a visual sensing. The visual sensing can comprise a visual sensing system having two cameras.

Figure 9:
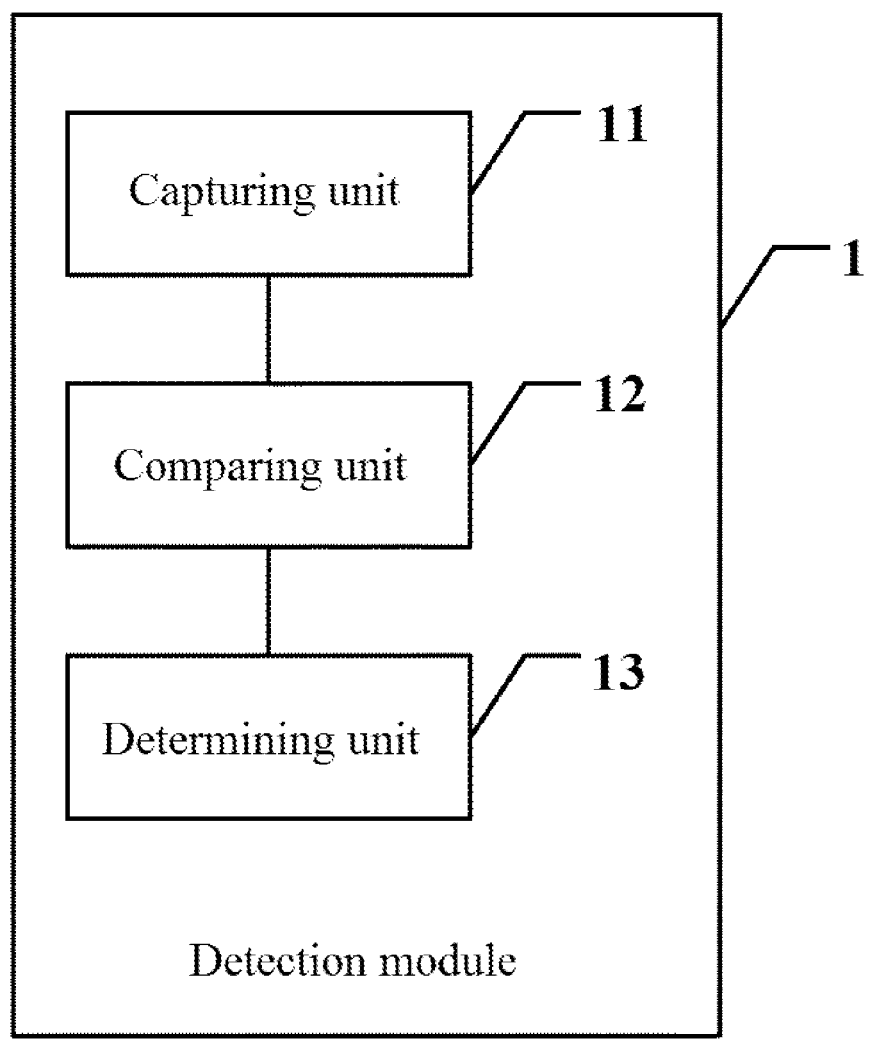
FIG. 9 shows a structure of a detection module in accordance with an embodiment of the disclosure.

In some embodiments, FIG. 9 shows the detection module 1 configured to sense a distance using a visual sensing. The detection module 1 can comprise a capturing unit 11, a comparing unit 12 and a determining unit 13.

The capturing unit 11 can be configured to capture at least two images in a target direction.

The comparing unit 12 can be configured to determine feature points in the at least two images, compare feature points and determine correlated feature points between the at least two images.

The determining unit 13 can be configured to calculate a first distance value from the movable object to the target object based upon the determined feature points.

In some instances, the comparing unit 12 can be configured to obtain an inclination angle of the movable object at a target direction, determine an effective area on each of the at least two images based upon the obtained angle, and determine a feature point in the effective area of a each image.

In some instances, the first distance value can be an average of a plurality of distance values between the movable object and the target object.

In some instances, the detection module 1 can be configured to detect the first distance value by a distance sensing process and a visual sensing process.

Figure 10:
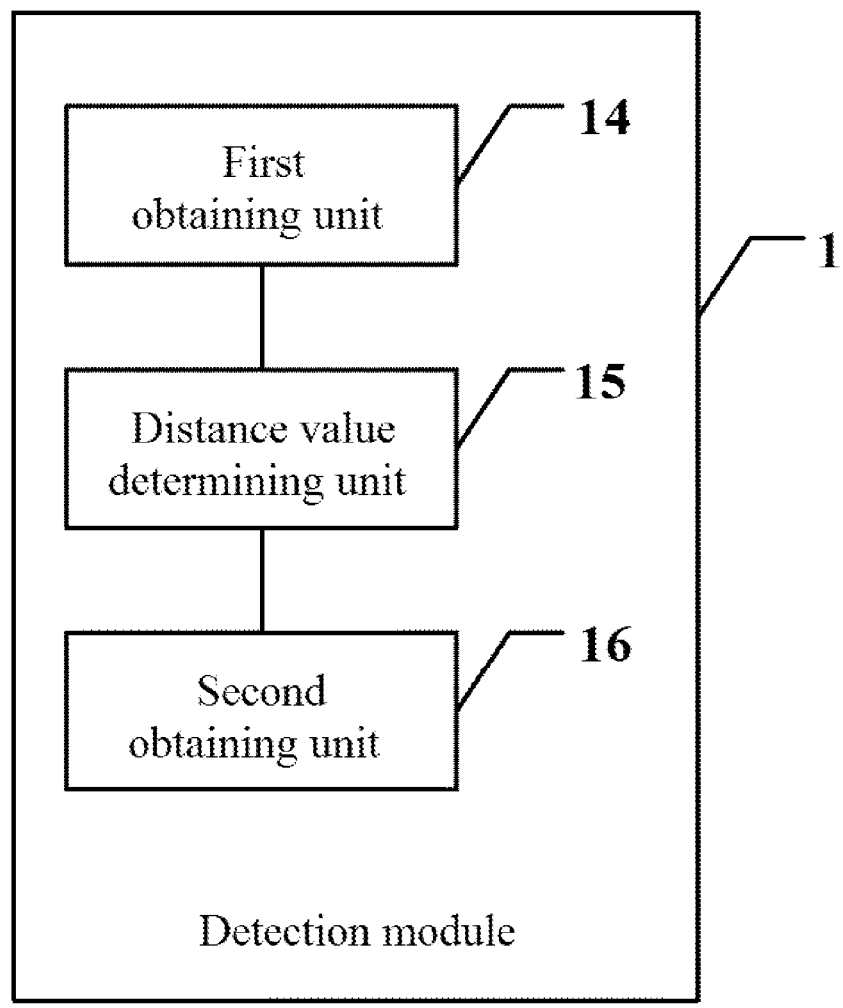
FIG. 10 shows a structure of a detection module in accordance with another embodiment of the disclosure.

In some instances, the detection module 1 can be configured to determine which distance sensing process is to be used based upon a distance detected by a distance sensor and/or a distance detected by a visual sensor. FIG. 10 shows the detection module 1 which can comprise a first obtaining unit 14, a distance value determining unit 15 and second obtaining unit 16.

The first obtaining unit 14 can be configured to obtain distance sensing data sensed by a distance sensing process and calculate a distance value from the distance sensing data.

The distance value determining unit 15 can be configured to, if the calculated distance value is less than a preset distance threshold, set the distance value as a first distance value.

The second obtaining unit 16 can be configured to, if the calculated distance value is larger than the preset distance threshold, obtain a first distance value between the movable object and the target object by a visual sensing process.

In some instances, the control module 3 can be configured to perform an obstacle avoidance based upon the actual distance. For instance, the obstacle avoidance can comprise limiting a moving speed or avoiding a target object.

In some instances, the control module 3 can be configured to perform a target tracking based upon the actual distance. For instance, the target tracking can comprise controlling a movement of the movable object, such that a distance between the movable object and the target object is within a predetermined tracking distance threshold.

It will be appreciated that, the functional modules and units as discussed in embodiments of the disclosure can be implemented with reference to corresponding methods or functional modules as described in the disclosure.

With embodiments of the disclosure, a directly detected distance value can be corrected to obtain a more accurate distance value, thereby enabling a more accurate control on a movement of the movable object.

Figure 11:
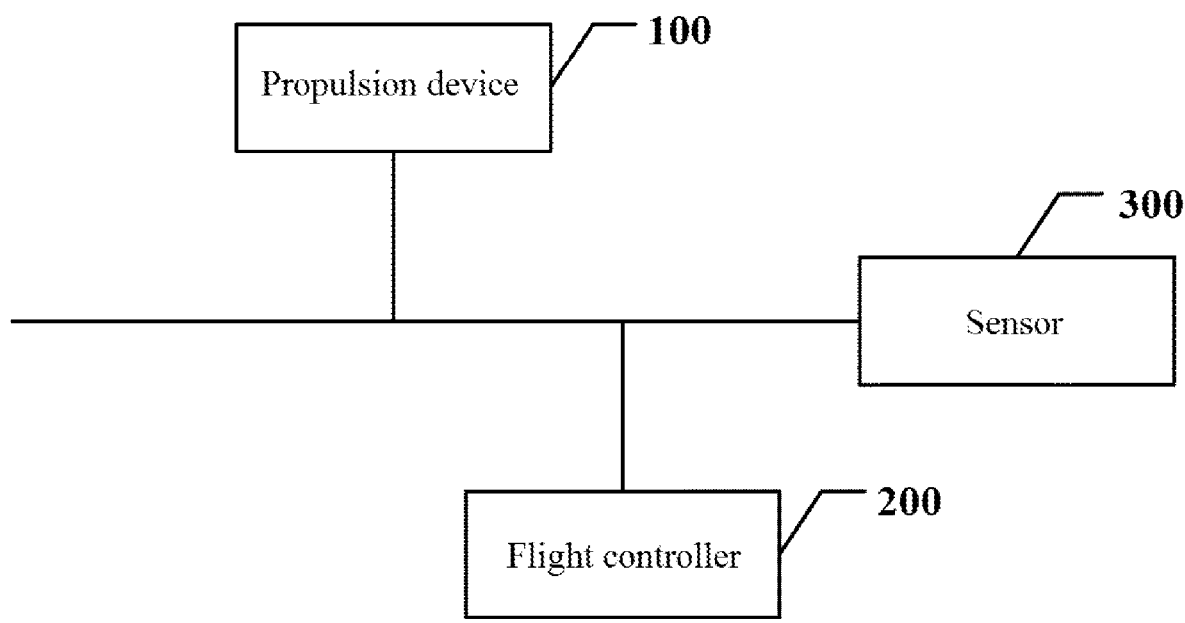
FIG. 11 shows a structure of an aerial vehicle in accordance with an embodiment of the disclosure.

FIG. 11 shows a structure of an aerial vehicle in accordance with embodiments of the disclosure. The aerial vehicle can comprise a propulsion device 100, a flight controller 200 and a sensor 300 in addition to various prior art vehicle frames and power supplies.

The sensor 300 can be configured to sense distance data from the aerial vehicle to a target object.

The flight controller 200 can be configured to determine a first distance value from the aerial vehicle to the target object based upon the sensed distance data of the sensor 300, the target object being positioned in a target direction of the aerial vehicle, obtain an inclination angle of the aerial vehicle at the target direction, and calculate a second distance value from the aerial vehicle to the target object based upon the obtained inclination angle and the first distance value.

In some instances, the flight controller 200 can be configured to provide a control instruction to the propulsion device 100 to control the propulsion device to effect a movement of the aerial vehicle based upon the second distance value.

It will be appreciated that, the flight controller 200 and the sensor 300 as discussed in embodiments of the disclosure can be implemented with reference to corresponding methods or functional modules as described in the disclosure shown in FIG. 1 to FIG. 10.

With embodiments of the disclosure, a directly detected distance value can be corrected to obtain a more accurate distance value, thereby enabling a more accurate control on a movement of the movable object.

Figure 12:
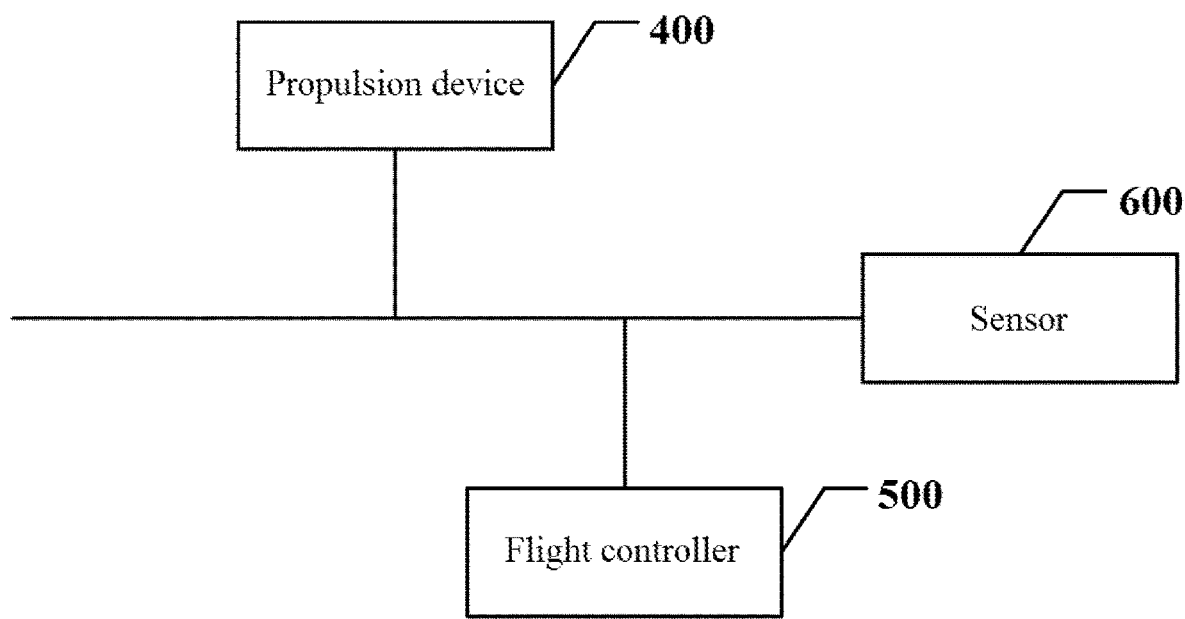
FIG. 12 shows a structure of an aerial vehicle in accordance with another embodiment of the disclosure.

FIG. 12 shows a structure of aerial vehicle in accordance with another embodiment of the disclosure. The aerial vehicle can comprise a propulsion device 400, a flight controller 500 and a sensor 600 in addition to various prior art vehicle frames and power supplies.

The sensor 600 can be configured to detect a first distance value from the aerial vehicle to a target object. The target object can be positioned in a target direction of the movable object.

The flight controller 500 can be configured to obtain an inclination angle of the aerial vehicle at the target direction and calculate a second distance value from the aerial vehicle to the target object based upon the obtained inclination angle and the first distance value.

In some instances, the flight controller 500 can be configured to provide a control instruction to the propulsion device 400 to control the propulsion device 400 to effect a movement of the aerial vehicle based upon the second distance value.

It will be appreciated that, the flight controller 500 and the sensor 600 as discussed in embodiments of the disclosure can be implemented with reference to corresponding methods or functional modules as described in the disclosure shown in FIG. 1 to FIG. 10.

With embodiments of the disclosure, a directly detected distance value can be corrected to obtain a more accurate distance value, thereby enabling a more accurate control on a movement of the movable object.

It will be appreciated that, the relevant device and method disclosed in embodiments of the disclosure can be implemented in other manners. For example, the described device embodiments are merely illustrative. For example, a division of modules or units is merely a division based upon a logical function. Different division can be possible in actual implementation. For example, multiple units or components can be combined or integrated on another system. For example, some features can be ignored or not be performed. For example, a mutual coupling, a direct coupling or a communication connection as shown or discussed can be an indirect coupling or a communication connection via an interface, a means or a unit. The coupling can be an electrical coupling or a mechanical coupling.

The units illustrated as separate parts may or may not be physically separated. The parts shown as units may or may not be physical units. For example, the parts can be provided at the same location or distributed over a plurality of network units. All or part of the modules can be selected to implement the embodiments of the disclosure according to actual requirements.

Various functional units in the embodiments of the disclosure may be integrated in one processing unit. The functional units can be separate and physical units. Two or more units may be integrated in one unit. The integrated units may be implemented as hardware or software functional units.

The integrated units, if implemented as software functional units and sold or used as independent products, may be stored in a computer-readable storage medium. With such an understanding, all or part of the technical solution may be embodied as a software product. The computer software product is stored in a storage medium and includes several instructions for causing a computer processor to execute entire or part of a method according to the various embodiments of the present disclosure. The above mentioned storage medium includes various media capable of storing program code, such as a U disk, a removable hard disk, ROM (read-only memory), RAM (random access memory), and a diskette, an optical disk.

The foregoing embodiments are intended to merely illustrate rather than limit the scope of the present disclosure. Numerous equivalent structures or equivalent flow variations made in light of the specification and the accompanying drawings of the present disclosure, whether directly or indirectly applied to other related technical art, are within the scope of the present disclosure.

What is claimed is:

1. A method for distance detection comprising:
sensing, using a distance sensor configured on an aerial vehicle, a distance value corresponding to a target object in a target direction of the aerial vehicle, the distance sensor including one or more of an ultrasonic sensor, an infrared sensor, a radar sensor, and a laser sensor;
determining, by a processor configured on the aerial vehicle, whether the distance value is less a preset distance threshold;
in response to the distance value being less the preset distance threshold, determining, by the processor, the sensed distance value as the first distance value;
in response to the distance value being no less than the preset distance threshold, obtaining, using two visual sensors and the processor, a visual distance value corresponding to the target object, and determining, by the processor, the visual distance value as the first distance value;
obtaining, using an inclination sensor configured on the aerial vehicle, an inclination angle of the aerial vehicle at the target direction, the inclination sensor including a gyroscope or an accelerometer;
calculating, by the processor, a second distance value from the aerial vehicle to the target object based upon the inclination angle and the first distance value; and
controlling, by a flight controller configured on the aerial vehicle, a movement of the aerial vehicle based upon the second distance value.

2. The method of claim 1, wherein obtaining the visual distance value corresponding to the target object comprises:
obtaining, using the two visual sensors, at least two images in the target direction;
determining, by the processor, feature points in each of the at least two images;
performing, by the processor, feature point comparison and determining correlated feature points between the at least two images; and
calculating, by the processor, the visual distance value corresponding to the target object based upon the correlated feature points.

3. The method of claim 2, wherein determining the feature points in each of the at least two images comprises:
determining, by the processor, an effective area in each of the at least two images based upon the inclination angle; and
determining, by the processor, the feature points in the effective area of each of the at least two images.

4. The method of claim 2, wherein:
the correlated feature points include a group of sparse feature points, and
calculating the visual distance value corresponding to the target object based upon the correlated feature points comprises calculating, by the processor, the visual distance value corresponding to the target object based upon the sparse feature points.

5. The method of claim 2, wherein:
the correlated feature points include a group of dense feature points, and
calculating the visual distance value corresponding to the target object based upon the correlated feature points comprises calculating, by the processor, the visual distance value corresponding to the target object based upon the dense feature points.

6. The method of claim 2, wherein controlling the movement of the aerial vehicle based upon the second distance comprises performing, by the flight controller, an obstacle avoidance based upon the second distance, the obstacle avoidance comprising limiting a moving speed of the aerial vehicle or avoiding the target object.

7. The method of claim 2, wherein controlling the movement of the aerial vehicle based upon the second distance comprises performing a target tracking based upon the second distance, the target tracking comprising controlling the movement of the aerial vehicle such that a distance between the aerial vehicle and the target object is within a predetermined tracking distance threshold.

8. A device for distance detection comprising:
a processor; and
a memory storing instructions that, when executed by the processor, cause the processor to:
control a distance sensor configured on an aerial vehicle to sense a distance value corresponding to a target object in a target direction of the aerial vehicle, the distance sensor including one or more of an ultrasonic sensor, an infrared sensor, a radar sensor, and a laser sensor;
determine whether the distance value is less a preset distance threshold;
in response to the distance value being less the preset distance threshold, determine the sensed distance value as the first distance value;
in response to the distance value being no less than the preset distance threshold, control two visual sensors to obtain a visual distance value corresponding to the target object, and determine the visual distance value as the first distance value;
control an inclination sensor configured on the aerial vehicle to obtain an inclination angle of the aerial vehicle at the target direction, the inclination sensor including a gyroscope or an accelerometer; and
calculate a second distance value corresponding to the target object based upon the inclination angle and the first distance value; and
control a movement of the aerial vehicle based upon the second distance value.

9. The device of claim 8, wherein the instructions further cause the processor to:
control the two visual sensors to obtain at least two images in the target direction;
determine feature points in each of the at least two images;
perform feature point comparison and determine correlated feature points between the at least two images; and
calculate the first distance value corresponding to the target object based upon the correlated feature points.

10. The device of claim 9, wherein the instructions further cause the processor to:
determine an effective area in each of the at least two images based upon the inclination angle; and
determine the feature points in the effective area of each of the at least two images.

11. The device of claim 9, wherein:
the determined feature points include a group of sparse feature points, and
the instructions further cause the processor to calculate the first distance value corresponding to the target object based upon the sparse feature points.

12. The device of claim 9, wherein:
the determined feature points include a group of dense feature points, and
the instructions further cause the processor to calculate the first distance value corresponding to the target object based upon the dense feature points.

13. The device of claim 9, wherein the instructions further cause the processor to perform an obstacle avoidance based upon the second distance, the obstacle avoidance comprising limiting a moving speed of the aerial vehicle or avoiding the target object.

14. The device of claim 9, wherein the instructions further cause the processor to perform a target tracking based upon the second distance, the target tracking operation comprising controlling a movement of the aerial vehicle such that a distance between the movable object and the target object is within a predetermined tracking distance threshold.

15. An aerial vehicle comprising:
a propulsion device;
a distance sensor configured to sense a distance value corresponding to a target object, the distance sensor including one or more of an ultrasonic sensor, an infrared sensor, a radar sensor, and a laser sensor;
two visual sensors configured to obtain a visual distance value corresponding to the target object;
an inclination sensor configured to obtain an inclination angle of the aerial vehicle at the target direction, the inclination sensor including a gyroscope or an accelerometer; and
a flight controller configured to:
determine whether the sensed distance value is less a preset distance threshold;
in response to the sensed distance value being less the preset distance threshold, determine the sensed distance value as the first distance value;
in response to the distance value being no less than the preset distance threshold, determine the visual distance value as the first distance value;
calculate a second distance value from the aerial vehicle to the target object based upon the inclination angle and the first distance value; and
provide a control instruction to the propulsion device to control the propulsion device to effect a movement of the aerial vehicle based upon the second distance value.

* * * * *